D. B. McILVIN

3,200,438

INJECTION SOLE MOLDING MACHINES

Filed Oct. 17, 1962

Aug. 17, 1965  D. B. McILVIN  3,200,438
INJECTION SOLE MOLDING MACHINES
Filed Oct. 17, 1962  8 Sheets-Sheet 8

United States Patent Office 3,200,438
Patented Aug. 17, 1965

3,200,438
INJECTION SOLE MOLDING MACHINES
Donald B. McIlvin, Danvers, Mass., assignor to United Shoe Machinery Corporation, Boston, Mass., a corporation of New Jersey
Filed Oct. 17, 1962, Ser. No. 231,222
6 Claims. (Cl. 18—4)

This invention relates to injection molding machines, and is herein illustrated in its application to machines for molding and attaching soles, or sole and heel units, to the bottoms of lasted shoe uppers. A machine of this type is disclosed, for example, in United States Letters Patent No. 3,006,032, granted October 31, 1961 on an application filed in the names of Baker, Berggren, McIlvin and Spencer. The illustrated machine is generally similar to the machine disclosed in United States Letters Patent No. 2,937,405, granted May 24, 1960 on an application filed in the names of Berggren, Dorosz and Leahy and in certain respects is similar to the machine disclosed in United States Letters Patent No. 2,589,323, granted March 18, 1952 on an application filed in the names of Ashley and Leahy. While the invention is herein illustrated in its application to machines for molding and attaching soles to the bottoms of lasted shoe uppers, it is to be understood that the invention is not limited in scope to machines of this type but in certain respects is applicable generally to injection molding machines.

It is an object of the present invention to improve the operation and increase the production obtainable in machines of the type above referred to and particularly to render automatic certain operations heretofore performed manually in machines of this type.

It is a further object of the invention to provide more effective and reliable means for supplying fluid plastic to the mold charging means for machines of this type.

It is a still further object of the invention to provide in machines of this type an improved means for effecting a parting of a shoe with a sole newly molded thereon from the mold elements of the machine.

With the above and other objects in view, as will hereinafter appear, the present invention in one aspect thereof contemplates the provision in an injection molding machine having a carrier for a plurality of mold elements and a conveyor means for transferring the carrier from a mold charging station, step by step, through a plurality of idle stations to a discharging station and thence back to the charging station, of means operated by the adavncement of the carrier as it approaches the discharging station for causing the side mold members of the mold assembly to move away from the bottom mold member preparatory to the parting of the shoe together with a newly molded sole thereon from the bottom mold member. In order to arrange the mold members for the next succeeding mold charging operation there is provided in the discharging station, means for causing the side mold members to be brought into mold closing relation to the bottom mold member. In the illustrated machine the movement of separation of the side mold members from the bottom mold member is effected by a fixed cam member arranged alongside the path of movement of the carrier for engagement by a cam lever mounted on the carrier and connected to the side mold members. For closing the side mold members while the carrier is stationary in the discharging station, the illustrated machine is provided with a pressure fluid operated actuator arranged to act against an operating member mounted on the carrier and connected to the side mold members.

In order to provide a substantially rectilinear parting movement of a shoe and a newly molded sole thereon from the mold assembly, the hinged arm which carries the shoe form is provided with a shoe form supporting means herein illustrated as a platen hinged on the arm and constructed and arranged for angular movement such that the parting movement from the mold assembly of the shoe and a newly molded sole thereon occurs without significant angular movement of the shoe relatively to the mold assembly. This is achieved in the illustrated organization by so mounting the shoe form supporting platen that it receives a swinging movement in a reverse direction to the swinging movement of the arm during the parting movement of the shoe.

In order to improve the organization for supplying fluid plastic to the mold charging means, and particularly to provide for a constant and reliable flow of plastic to the mold charging cylinder, the illustrated machine is provided with an improved feeding and cutting means for supplying solid plastic in fragmented condition to the auger of an extruder. Plastic is fed to the feeding and cutting means in the form of a continuous length of tape. The tape is fed through a suitable opening in an extruder cylinder to a head mounted to rotate in the cylinder, said head having a cutter which feeds the tape along a predetermined path within the cylinder to a shearing point where an end portion of the tape is sheared off against a stationary cutter mounted in the cylinder. In the illustrated organization the inner wall of the cylinder is provided with a helical groove for guiding the tape and the stationary cutter is located at the terminus of the helical groove. Preferably, the cutter carried by the head extends helically about the head at a helix angle such that fragmented plastic is fed by the cutter from the head to the auger. The illustrated head has a plurality of such cutters uniformly spaced from each other about the head to cut the tape into fragments of the desired length. The cutters positively feed the tape through the helical groove in the inner wall of the cylinder to the shearing point and after the shearing operation the cutters continue the feed of the now fragmented plastic downstream along the cylindrical surface of the head to the auger. The constant feed of plastic from the head to the auger keeps the auger fully loaded and enables it to maintain a constant and uniform flow of fluid plastic into the mold charging cylinder.

These and other features of the invention will now be described with reference to the accompanying drawings and pointed out in the appended claims.

The invention is herein illustrated and described as embodied in a machine having a mold charging organization and a plurality of ambulatory assemblies which comprise mold elements and work supporting means generally similar in their construction and operation to those illustrated in the Baker et al. Patent No. 3,006,032, hereinbefore referred to.

The illustrated machine is provided with an endless conveyor mechanism on which eight ambulatory assemblies are mounted at positions uniformly spaced along its length. The conveyor mechanism advances the ambulatory assemblies successively from a discharging station in which a shoe with a sole newly molded thereon is parted or disengaged from the mold assembly and removed from the work support and a lasted shoe onto which a sole is to be molded is mounted on the work support. From the discharging station each ambulatory assembly is advanced in one step to a charging station in which the mold cavity is charged with plastic thereby to form a sole on the shoe bottom. From the charging station the conveyor mechanism successively advances the ambulatory assembly in a plurality of steps to complete the circuit terminating at the discharging station. Sufficient time elapses during the movement of each ambulatory assembly from the charging station to the discharging station for the curing or solidification of the newly molded sole on the shoe bottom to a degree sufficient to permit the opening of the mold at the discharging station and the removal of the shoe from the work support.

Figure 1:
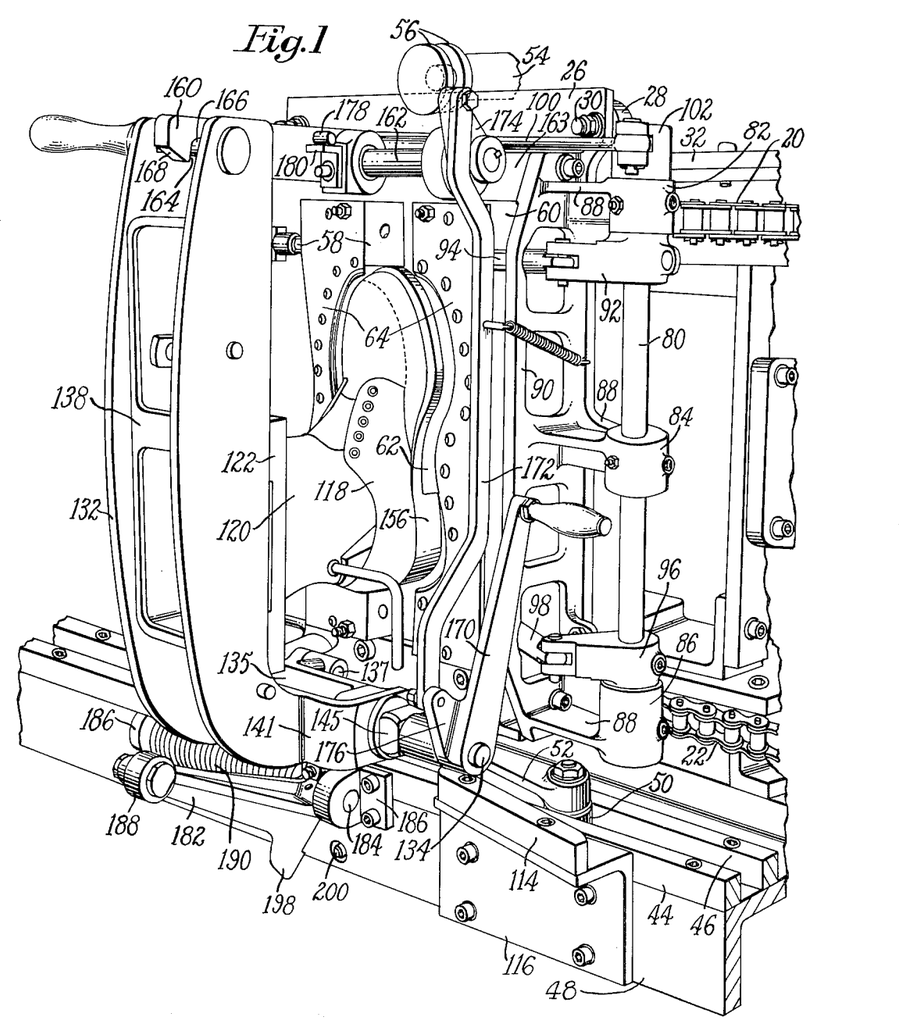
FIG. 1 is a perspective view illustrating a portion of a machine embodying the features of the present invention.
Figure 2:
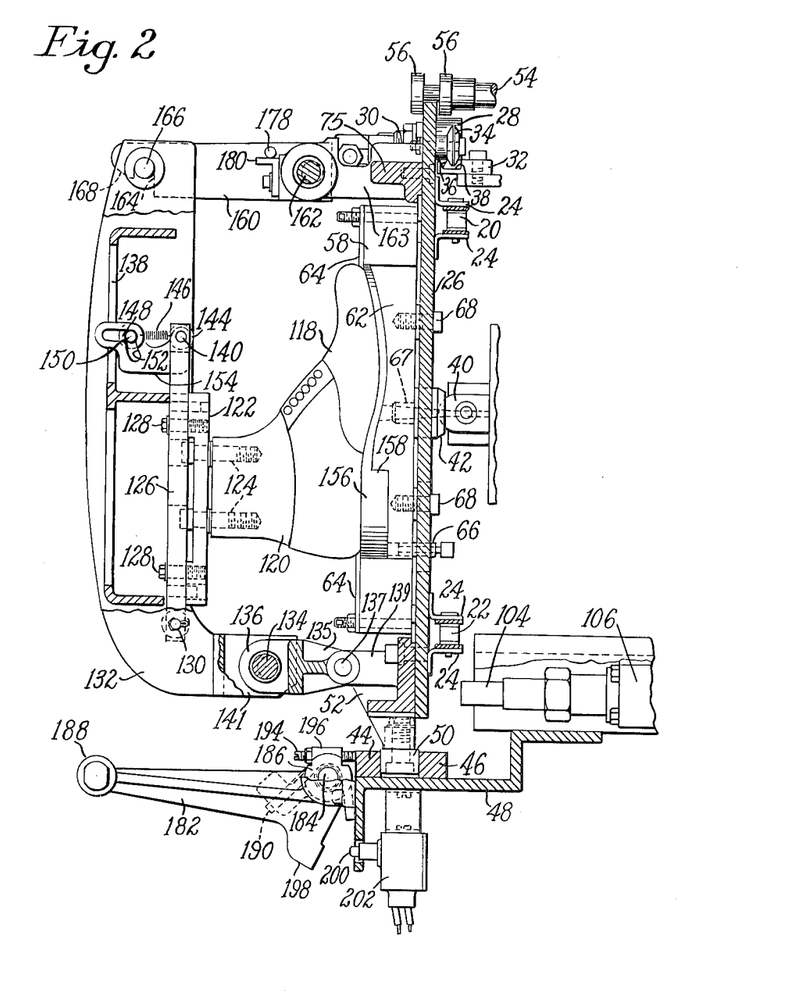
FIG. 2 is a side elevation taken at the mold charging station with certain parts shown in section on a plane common to the longitudinal median line of a shoe in the machine.
Figure 2A:
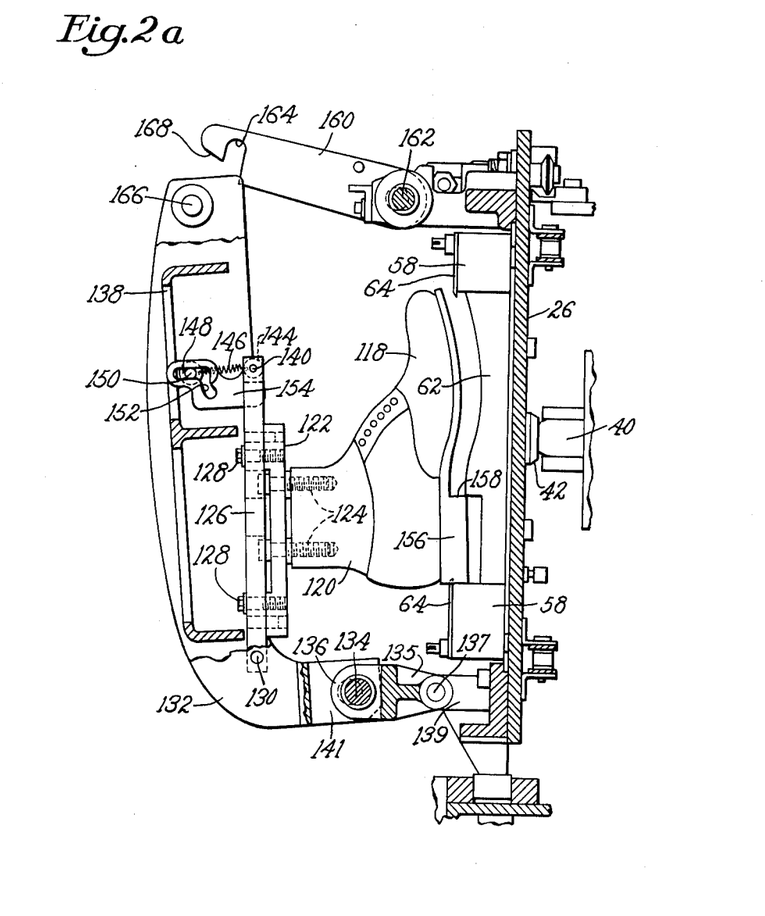
FIG. 2A is a side elevation similar to FIG. 2 showing the position of the shoe during a first stage of its movement away from the mold assembly.
Figure 2B:
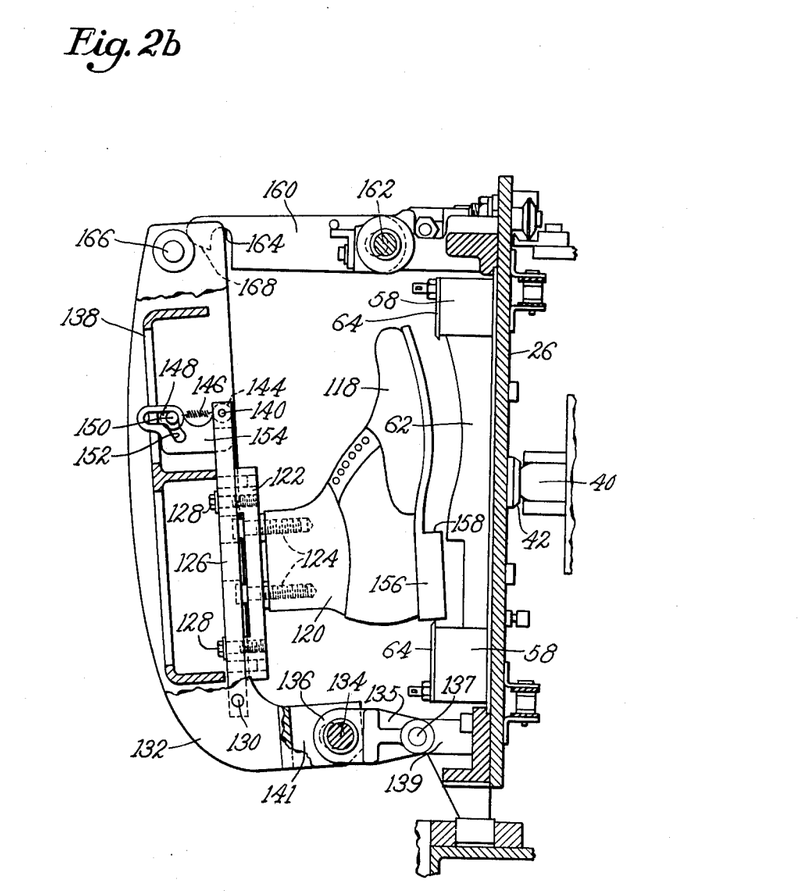
FIG. 2B is a side elevation similar to FIG. 2A showing the position of the shoe during a second stage of its movement away from the mold assembly.

Referring to FIG. 1 illustrating one of the eight ambulatory assemblies with which the machine is equipped, said assembly is mounted on an endless conveyor comprising an upper chain 20 and a lower chain 22. Referring to FIG. 2, the ambulatory assembly is connected to the conveyor chains by brackets 24 secured to the back of a mold carrier herein illustrated as a vertically disposed plate 26. The ambulatory assembly is supported for horizontal movement by two rolls 28, one of which is illustrated in FIG. 2. The illustrated rolls are mounted on suitable bolts 30 at the upper extremity of the plate 26 and said rolls extend rearwardly from the plate for engagement with a horizontal rail 32. For determining the path of movement of the supporting rolls on the rail 32 a guide roll 34 is constructed and arranged to run in a suitable V groove 36 formed in the rail. As shown in FIG. 2 the guide roll has been displaced rearwardly from the line of the groove 36 into a recess 38 formed in the rail by a movement of the ambulatory assembly to make contact between an injection nozzle 40 and a sprue member 42 mounted in the carrier plate. Upon the completion of the mold charging operation the ambulatory assembly is moved forwardly to bring the guide roll 34 into alinement with the V groove 36 whereupon the operation of the conveyor assembly is resumed. The lower portion of the ambulatory assembly is held against forward and rearward movement by two parallel rails 44 and 46 fixed to a frame member 48 and spaced to receive between them two guide rolls 50 rotatably mounted, respectively, on oppositely extending arms of a casting 52 secured to the lower portion of the plate 26.

For swinging the ambulatory assembly rearwardly to bring the sprue member 42 (FIG. 2) into contact with the injection nozzle 40 the illustrated machine is provided with a piston and cylinder assembly fixed to the machine frame and having a piston rod 54 extending forwardly and provided with spaced heads 56 which straddle the upper margin of the carrier plate 26 in the mold charging station. The advancement of the ambulatory assembly into the mold charging station causes the operation of a limit switch which initiates the actuation of the piston 54 to swing the ambulatory assembly rearwardly into its mold charging position illustrated in FIG. 2.

Figure 3:
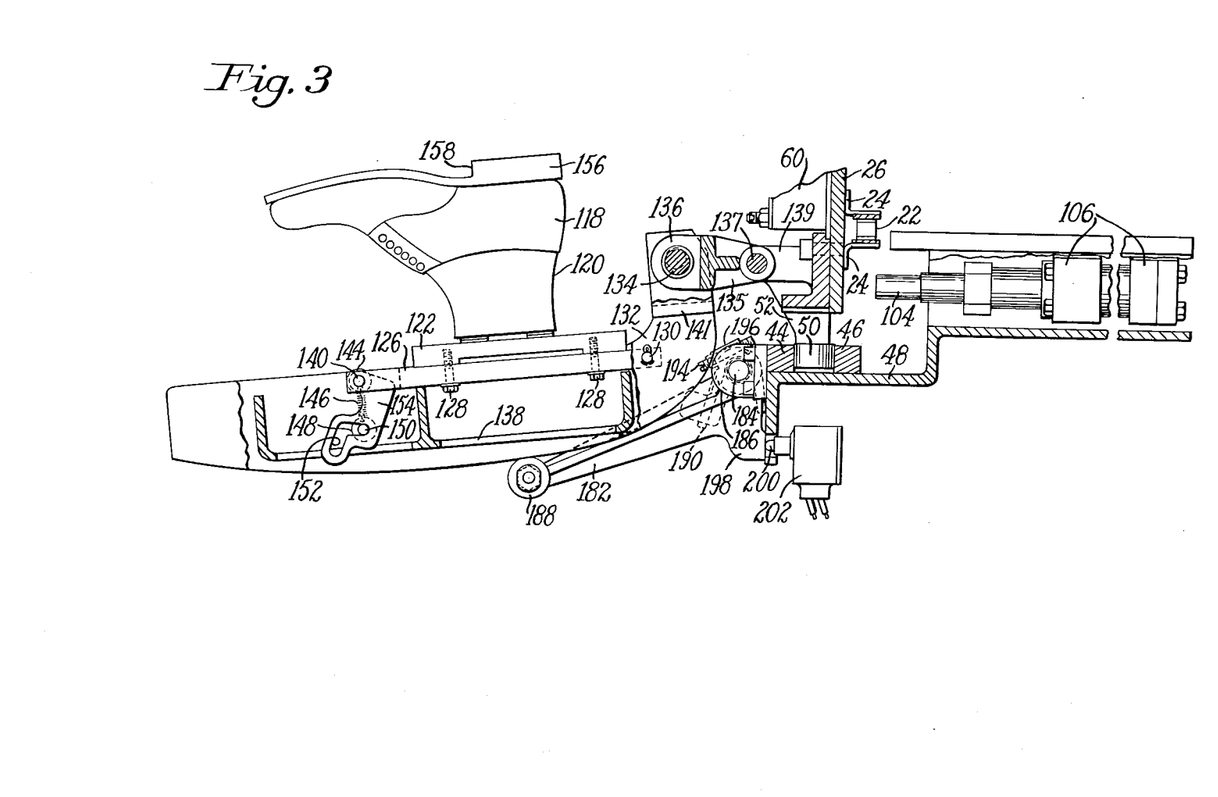
FIG. 3 is a side elevation taken at the mold discharging station showing the work supporting assembly in its unloading position, certain parts being shown in section on the same plane as in FIG. 2.
Figures 5, 6:
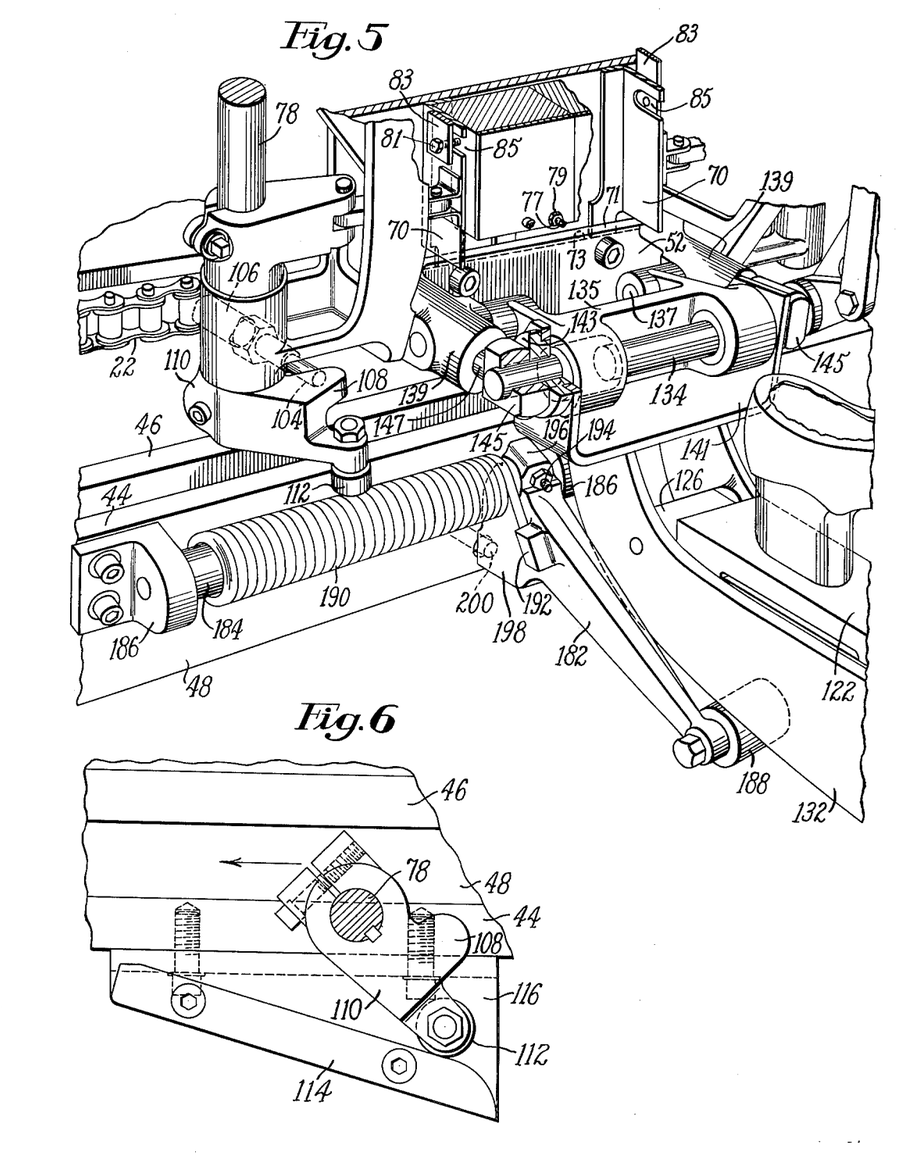
FIG. 5 is a perspective view illustrating particularly the features of the side mold closing organization.
FIG. 6 is a plan view illustrating the side mold opening means.

Referring to FIG. 1, the illustrated mold assembly comprises side mold members 58 and 60 which in their closed position define the periphery of a sole and heel unit, and a bottom mold member 62 complemental in shape to the bottom or tread surface of said unit. The illustrated bottom mold member is designed to form a sole and heel unit having a square breast face, that is, a breast face substantially perpendicular to the tread face of the heel. Secured to the forward surfaces of the side mold members, respectively, are plates 64 which define the periphery of the shoe bottom at its juncture with the sole. Referring to FIG. 2, the bottom mold member is positioned relatively to the carrier plate 26 by the cylindrical shank portion 67 of the sprue member 42 which, as shown in FIG. 2, is seated in a suitable socket provided in the bottom mold member. The bottom mold member is held against angular movement relatively to the carrier plate 26 by a cylindrical member 66 mounted in the bottom mold member and extending through a vertical slot provided in the carrier plate. The bottom mold member is secured to the carrier plate by headed screws 68 which are readily removable to permit the substitution of another bottom mold member of a different size or style. Referring to FIG. 5, the side mold members are mounted in suitable holders 70 of right angular construction arranged for horizontal sliding movement upon the forward surface of the carrier plate 26. In order to retain each holder in contiguous relation to the carrier plate, it is provided with a downward extension 71 which is seated in a rabbet 73 provided in the casting 52 and similarly the upper portion of the holder is provided with an upward extension (not shown) which is seated in a rabbet formed in a casting 75 (FIG. 2) secured to the upper portion of the carrier plate 26. For holding the inner portions of the side mold members against movement away from the carrier plate, each side mold member is provided at its upper and lower extremities, respectively, with bolts 77 having thin flat heads of generally rectangular construction which, upon loosening the nuts 79, may be turned to bring the head into a vertical position in which it is seated in the rabbet. Each side mold member is secured to its holder by suitable clamping screws 81 extending through vertical clamping plates 83 and through open ended slots 85 formed in the holder and into suitable tapped holes in the side mold members. For closing and opening the side mold members each ambulatory assembly is provided with two vertical shafts 78 and 80 mounted at opposite sides of the ambulatory assembly. Referring to FIG. 1, the shaft 80 at the right side of the assembly is mounted for rotation in an upper bearing cylinder 82, a central bearing 84 and a lower bearing 86. Each bearing is formed integrally with an arm 88 projecting outwardly from an open frame structure 90 projecting forwardly from the carrier plate 26. A similar structure is provided for mounting the shaft 78 at the left side of the assembly. Secured to the upper portion of the shaft 80 is an arm 92 which is connected at its outer end to a link 94 to provide a toggle mechanism for closing and opening the side mold member 60. A similar arm 96 secured to the lower portion of the shaft 80 is connected at its outer end to a link 98 which is pivotally connected to the lower portion of the side mold holder. To provide for equal and opposite movements of the side mold members, the shafts 78 and 80 are operatively connected together by a link 100, the right end portion of which is pivotally connected to an arm 102 secured to and extending forwardly from the upper extremity of the shaft 80. At its left end the link 100 is pivotally connected to a similar arm secured to and projecting forwardly from the upper extremity of the shaft 78. In order to provide for movement of the side mold member 58 in a direction opposite to the movement of the side mold member 60, the toggle members connected to the mold carrier for the side mold member 58 move rearwardly into their broken position while the toggle members connected to the mold carrier for the right side mold member 60 move forwardly into their broken position. This arrangement provides for opposite movement of the side mold members by rotation of the shafts 78 and 80 in the same direction. Closing movement of the side mold members is effected by rotation of said shafts in a clockwise direction as seen from above and opening movement of the side mold members by counterclockwise rotation of said shafts. For closing the mold assembly, the toggle elements above described are brought into their straightened position illustrated in FIG. 5 by the operation of a fluid pressure actuated piston 104 mounted in a cylinder 106 secured to the frame member 48 (FIG. 3) at the discharging station. The piston is arranged to engage an extension 108 (FIG. 6) of an arm 110 secured to the lower extremity of the shaft 78. The piston moves the extension 108 forwardly, thus rotating the shaft 78 in a clockwise direction as seen from above to straighten the toggles at the left side of the mold assembly, and the shaft 78 operates through the link 100 to rotate the shaft 80 at the right side of the mold assembly in the same direction, thereby to operate the toggles at the right side of the assembly to close the side mold member 60 simultaneously with the closing of the left side mold member 58. For causing the side mold members to open as the ambulatory assembly approaches the discharging station the arm 110 is provided with a cam roll 112 which engages a fixed cam member 114 (FIG. 6) during the final step of the travel of the ambulatory assembly to the discharging station. The cam member 114 is fixed to an angular shelf provided by a bracket 116 secured to the frame member 48. The cam member causes the arm 110 to move rearwardly, thus breaking the toggles and moving the mold members away from each other into their open position shown in FIG. 1.

Figure 4:
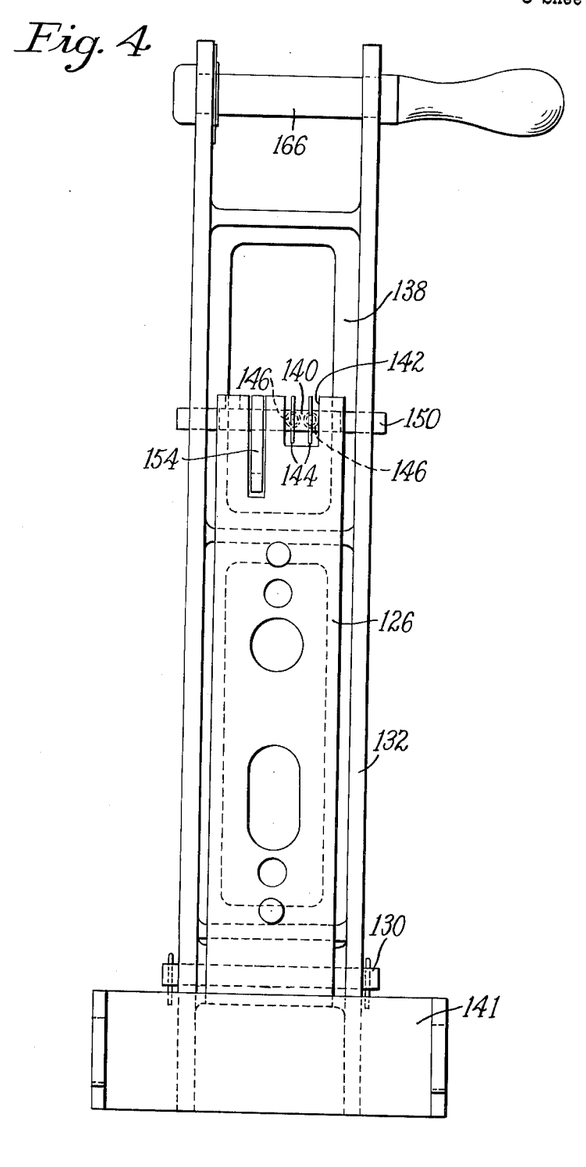
FIG. 4 is a rear elevation showing the work supporting assembly in its position illustrated in FIG. 2.

Referring to FIG. 2, a lasted shoe 118 is mounted on a shoe form 120 having a shank portion which terminates in a plane surface substantially parallel to the bottom of the form. The form is removably attached to a plate 122 by headed screws 124 and the plate in turn is adjustably secured to a platen 126 by headed screws 128. The platen 126 is pivotally mounted at its lower extremity on a cross shaft 130 carried by a generally L-shaped arm 132 constructed and arranged to swing from its position in FIG. 3 into its position illustrated in FIG. 2 to advance the shoe from its loading position to its mold closing position. During the swinging movement of the arm 132 from its mold closing position the platen 126 swings relatively to the arm in a direction reverse to the swinging movement of the arm so that parting movement from the mold assembly of a shoe and a sole newly molded thereon occurs without significant angular movement of the shoe relatively to the mold assembly. Angular movement of the shoe relatively to the mold assembly during the parting movement will be regarded as not significant provided such angular movement causes no damage to the newly molded sole and causes no separation thereof from the shoe bottom. Referring to FIG. 4, the arm 132 comprises spaced parallel plates interconnected by an open web structure 138. As shown in FIG. 2, the web structure is located in the forward portion of the arm and the platen is positioned between the parallel plates of the arm in the rear portion thereof where it is free to swing rearwardly without interference from the web structure. At its upper extremity the platen 126 carries a cross shaft 140. Referring to FIG. 4, the cross shaft extends through an opening in the platen provided by a notch 142. Within this opening there are mounted on the cross shaft two washers 144, each of which provides an anchorage for the rear portion of a spring 146, the forward portion of each spring being anchored to a washer 148 (FIG. 2) carried by a cross shaft 150 mounted in the parallel plates comprising the arm 132. The shaft 150 extends through a slot 152 formed in a link 154 pivotally mounted on the cross shaft 140, said slot having an arcuate section concentric to the cross shaft 140 and a rectilinear section extending forwardly from the upper extremity of the arcuate section in alinement with the cross shaft 140. The springs 146 urge the platen 126 forwardly into a position in which the upper portion of the arcuate section of the slot 152 bears against the cross shaft 150 as shown in FIG. 2. During the initial forward movement of the arm 132, to effect a parting of the newly formed sole and heel unit 156 on the shoe 118 from the bottom mold member 62, the platen 126 swings rearwardly upon the cross shaft 130 against the resistance of the springs 146. Such movement of the platen is caused by the resistance of the bottom mold member 62 to upward movement of the heel end portion of the sole and heel unit 156. It will be seen that the rearward swinging movement of the platen tends to move the newly molded sole downwardly, thus counteracting the opposing tendency of the forward movement of the arm 132 to move the sole upwardly and causing a mold parting movement of the newly molded sole and heel unit 156 from the bottom mold member 62 which is substantially rectilinear and generally heightwise of the shoe. Such rectilinear movement continues until the breast face 158 of the heel portion of the sole and heel unit has disengaged the bottom mold member, whereupon the springs 146 return the platen to its position illustrated in FIG. 2 in which position the platen is maintained, initially by the springs and finally by the action of the springs supplemented by the weight of the platen and shoe form assembly, until the arm 132 comes to rest in its position illustrated in FIG. 3. During the final stage of the downward movement of the arm the link 154 swings by gravity on the shaft 140 in a clockwise direction into its position illustrated in FIG. 3 in which the position of the link is determined by the engagement of the end wall of the arcuate portion of the slot 152 with the shaft 150. It will be seen that the link in this position positively holds the platen against swinging movement relatively to the arm 132 and thus provides a relatively rigid mounting of the shoe form 120 which facilitates the unloading from the shoe form of the shoe 118 with the newly molded sole thereon and the subsequent loading on the shoe form of a lasted shoe onto which a sole and heel unit is to be molded.

The shoe form supporting arm is retained in its upwardly swung position illustrated in FIGS. 1 and 2 by a latch arm 160 pivotally mounted on an eccentric cross shaft 162 journaled in suitable arms 163 projecting forwardly from the carrier plate 26. At its forward end the latch arm has a notch 164 which receives a cross pin 166 mounted in the upper portion of the arm 132. The latch arm has a cam face 168 at its forward extremity which is engaged by the cross pin 166 during the upward movement of the arm 132, thus displacing the latch arm upwardly to permit the arm 132 to move into its latched position illustrated in FIG. 2. When the arm 132 is in its downwardly swung position illustrated in FIG. 3 the latch arm 160 is supported in a horizontal position by the engagement of a pin 178 in the rear portion of the latch arm with a fixed bracket 180.

In order to provide for the clamping of a lasted shoe on the shoe form 120 against the beveled inner margins of the plate 64 preparatory to the mold charging operation, the arm 132 is constructed and arranged for rearward movement from its position illustrated in FIG. 1. In the illustrated organization, such rearward movement is effected by rotation of the eccentric shaft 162 in a counterclockwise direction as seen in FIG. 2 and by like rotation of an eccentric shaft 134 on which the arm 132 is pivotally mounted. Referring to FIG. 5, the shaft 134 is carried by the forwardly extending arms of an H-shaped member 135 mounted for vertical swinging movement on studs 137 projecting inwardly from cylindrical forward extensions 139 of the casting 52. The eccentric end portions of the shaft 134 extend through the arms of a yoke 141 secured to the arm 132, through spacer members 143 and through bores in vertically slabbed off heads 145 of horizontally sliding shafts 147 mounted in axial bores in the extensions 139. For simultaneously rotating the shafts 134 and 162, thereby to bring the shoe into clamping engagement with the plates 64, a hand lever 170 (FIG. 1) is secured to the shaft 134 and operatively connected to the cross shaft 162 by a link 172 which is pivotally connected at its upper end to an arm 174 secured to the cross shaft 162 and at its lower end to an arm 176 projecting forwardly from the hub of the hand lever 170 in parallel relation to the arm 174. Forward and downward movement of the hand lever 170 operates the shafts 134 and 162 to bring a lasted shoe on the shoe form 120 into clamping engagement with the plates 64.

For braking the downward movement of the arm 132 and for assisting the operator in the first stage of its upward movement, an arm 182 (FIG. 5) is freely mounted on a horizontal shaft 184 mounted in fixed brackets 186 and carries at its free end a roll 188 arranged to engage the left side plate of the arm 132. The arm 182 is strongly urged upwardly by a torsion spring 190 surrounding the shaft 184 and having its right end portion extended to engage a boss 192 on the arm 182. The arm is normally held by the spring in its position illustrated in FIG. 2, said position being determined by the engagement of a stop pin 194 carried by an extension 196 of the hub of the arm with the rail 44. During the latter part of the downward movement of the arm a downward extension 198 of the rear portion of the arm engages a pushbutton 200 thereby to operate a microswitch 202 thus to cause the operation of the piston 104 (FIG. 5) which operates the toggle shafts 78 and 80 to advance the side mold members into their mutually closed position preparatory to the next mold charging operation.

Figures 7, 8:
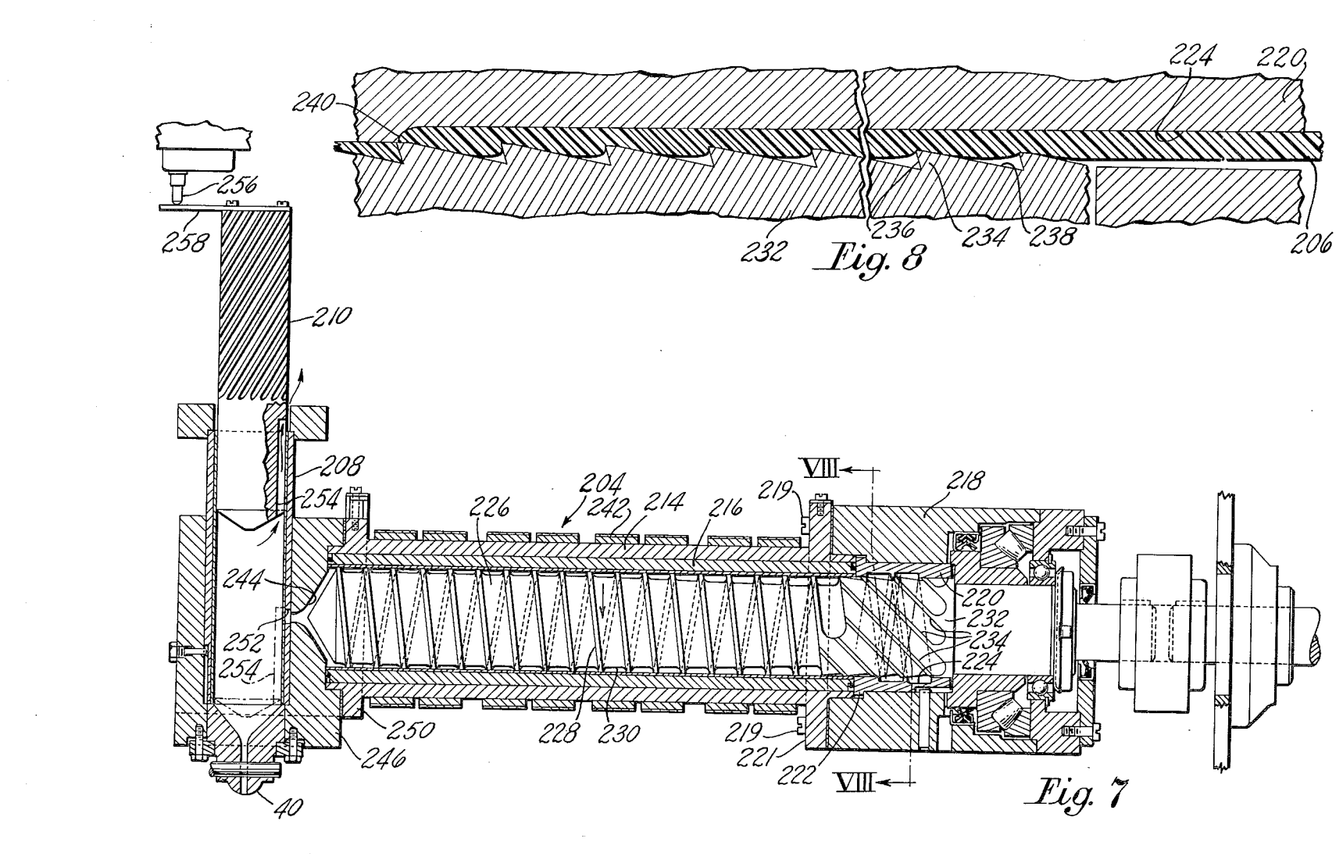
FIG. 7 is a plan view of the mold charging organization, mainly in section on a plane common to the axis of the extruder.
FIG. 8 is a broken developmental view taken on the helical line VIII—VIII of FIG. 7.

For charging the mold cavity with fluid plastic the illustrated machine has incorporated therein a plastic injecting organization generally similar in its construction and operation to that illustrated in United States Letters Patent No. 3,006,032 hereinbefore referred to. Referring to FIG. 7, this organization includes an extruder 204 of the auger type which receives plastic in the form of a continuous tape 206 (FIG. 8) from a reel (not shown) and after a milling or plasticating operation thereon by the extruder transmits the plastic in fluid condition to a cylinder 208 in which operates a piston 210 whereby fluid plastic in the cylinder is expelled through the injection nozzle 40 into the mold cavity. The illustrated extruding assembly comprises a casing 214 in which is mounted a sleeve 216 of wear resisting material. At its right end portion the casing is secured to a block 218 by screws 219 extending through a flange 221 formed in the casing. The block 218 is bored to receive a short sleeve 220 and counterbored to receive an outwardly extending flange 222 of the sleeve 220 and the end portions of the casing 214 and the sleeve 216. The short sleeve 220 has formed in its inner surface a helical groove 224 of decreasing depth into which a length of tape is fed from a supply through a port formed in the block 218 and the sleeve 220. The extruder is provided with a rotary screw 226 having a single thread 228, the flights of which are spaced apart from each other to an extent slightly greater than the width of the tape 206. The helical groove 230 between the flights of the thread decreases in depth from the receiving end of the screw to a point near the center of the screw lengthwise thereof and proceeds from that point downstream to the delivery end of the screw at approximately a uniform depth. At its receiving end the screw has a cylindrical head 232 which is provided with a plurality of spaced teeth 234 helically arranged about the head 232 at a helix angle of 45 degrees having, as seen in FIG. 7, an upward inclination in a direction downstream or toward the receiving end of the thread 228. The teeth 234 are constructed and arranged as shown in FIG. 8 with a leading undercut edge face 236 and an inclined upper surface 238 extending from the base of one tooth to a narrow land forming an acute angle with the edge face 236, the angle between the edge face and the land providing a cutting edge whereby the teeth feed the tape 206 through the groove 224 and to a cutting edge 240 formed at the terminus of the groove 224 where the tape is cut into short lengths by the shearing action of the teeth 234 against the stationary cutter 240. After cutting the tape into short lengths the teeth 234 operate to feed the short lengths downstream to the receiving end of the screw 226. The screw continues the feeding of the short lengths of tape and applies to the tape a vigorous milling or plasticating action which causes an increase in its temperature sufficient to reduce the plastic from a solid to a fluid state. In order to counteract any loss of heat from the plastic by radiation through the cylinder, suitable heating bands 242 are arranged about the outer surface of the casing 214. At the discharging end of the auger the fluid plastic flows into a shallow conical recess 244 formed in a block 246 which provides a union between the extrusion assembly and the injection assembly. The block 246 is counterbored to receive the extremity of the casing 214 which has an outwardly extending flange 250 which receives headed screws (not shown) whereby the casing is secured to the block. The recess 244 communicates with a port 252 formed in the cylinder 208. When the piston 210 is in its advanced position, indicated by broken lines in FIG. 7, fluid plastic flows into the downstream end portion of the cylinder 208 and into the nozzle 40 through a longitudinal groove 254 formed in the piston 210 and communicating with the port 252. In the operation of the extruding and injecting assembly the piston 210 is retracted into its position illustrated by full lines in FIG. 7 by the pressure of the fluid plastic extruded into the cylinder 208. The retracting movement of the piston is arrested upon the termination of the rotation of the screw 226. In the normal operation of the machine the rotation of the screw is caused to terminate by the operation of a microswitch 256 by a plate 258 secured to the rear end portion of the piston 210. In the event of a failure of the microswitch 256 to operate, or a failure of the extruder clutch (not shown) to open, rearward movement of the piston 210 continues briefly until the rear end portion of the groove 254 passes beyond the end wall of the cylinder 208 thus permitting he escape of fluid plastic from the rear end portion of the groove and obviating possible damage to the machine by an increase in pressure of fluid plastic in the cylinder 208.

Having thus described my invention, what I claim as new and desire to secure by Letters Patent of the United States is:

1. An injection molding machine in which a conveyor means transfers a vertically disposed carrier through a closed circuit from a mold charging station step by step through a plurality of idle stations to a discharging station and thence onward to the charging station, an arm fulcrumed at the lower extremity of the carrier for swinging movement between a horizontal position and a vertical position and arranged to mount a shoe form with its toe end uppermost when the arm is vertical, a mold assembly mounted on the carrier and designed to mold in situ onto a shoe on the form a sole and heal unit in which the heel has a square breast face, a platen fulcrumed on the arm at a point adjacent to the fulcrum of the arm on the carrier, means for securing the shoe form to the platen, and means for biasing the platen toward the arm, the arrangement of the platen relatively to the arm permitting the platen to swing away from the arm during swinging movement of the arm from its vertical position thereby to maintain a vertical disposition of the platen until the breast face of the newly molded heel has moved clear of the mold assembly, the biasing means yielding to permit such swinging movement of the platen.

2. In an injection molding machine in which a conveyor means transfers a vertically disposed carrier from a mold charging station, step by step, through a plurality of idle stations to a discharging station and thence to the mold charging station, an arm arranged to present a shoe form to a mold assembly mounted on the carrier in which assembly a shoe sole is molded onto the bottom of a shoe carried by the form, said arm being hinged on the carrier on an axis offset forwardly from the lower extremity of the carrier, and a shoe form supporting platen hinged on the arm on an axis offset forwardly from the axis of the arm on the carrier so that swinging movement of the arm in a direction to cause the shoe to part from the mold assembly, accompanied by a reverse swinging movement of the platen relatively to the arm, causes mold parting movement of the shoe and a sole newly molded thereon to occur without significant angular movement of the shoe relatively to the mold assembly.

3. In an injunction molding machine in which a conveyor means transfers a carrier from a mold charging station, step by step, through a plurality of idle stations to a discharging station and thence to the charging station, a mold assembly mounted on the carrier and constructed and arranged to mold a sole in situ onto the bottom of a shoe, an arm hinged on the carrier for swinging movement to transfer a shoe form between a mold closing position and an unloading position, a shoe form supporting platen hinged in the arm for angular movement relatively thereto such that parting movement from the mold assembly of the shoe and a sole newly molded thereon occurs without significant angular movement of the shoe relatively to the mold assembly, and means operating only in the unloading position of the arm for locking the platen against swinging movement relatively to the arm.

4. An injection molding machine according to claim 3 in which the locking means comprise a link connecting the free end of the platen to the arm, and constructed and arranged to operate by gravity, only in the unloading position of the arm, to lock the platen against swinging movement relatively to the arm.

5. An injection molding machine according to claim 3 in which the locking means comprises a link pivotally connected to the platen and provided with a generally angular slot within such there is positioned a pin mounted in the arm, said slot being so constructed and arranged that one length thereof is arcuate and concentric to the pivotal axis of the link on the platen and the other length thereof is radial to said axis.

6. In an injection molding machine for molding a shoe sole in situ onto the bottom of a supported shoe, a carrier, a conveyor means for transferring the carrier from a mold charging station along a closed circuit, step by step, through a plurality of idle stations to a discharging station, a sole molding assembly comprising a bottom mold member secured to the carrier and side mold members mounted on the carrier for movement toward and from each other to and from a position in which the side mold members engage the bottom mold member to provide an open mold cavity, means including toggle levers for moving the side mold members, respectively, toward and from their bottom mold engaging position, two shafts journaled, respectively, in bearings in the carrier at opposite sides of the mold assembly and arranged to mount the toggle levers, means interconnecting the shafts for equal and opposite movement, an arm secured to one of said shafts, means in the discharging station for actuating said arm thereby to straighten the toggle means and thus to effect the advancement of the side mold members into bottom mold engaging position, and means in the discharging station for causing the operation of said actuating means.

References Cited by the Examiner
UNITED STATES PATENTS

| | | | |
|---|---|---|---|
| 1,810,023 | 6/31 | Lodge | 18—12 |
| 2,579,747 | 12/51 | Martin | 18—12 |
| 2,589,323 | 3/52 | Ashley et al. | |
| 2,705,343 | 4/55 | Hendry | 18—30 |
| 2,710,425 | 6/55 | Rhodes | 18—30 |
| 2,754,545 | 7/56 | Hendry | 18—30 |
| 2,937,405 | 5/60 | Berggren et al. | 18—30 |
| 3,005,235 | 10/61 | Patera | 18—30 |
| 3,006,032 | 10/61 | Baker et al. | 18—12 |
| 3,055,056 | 9/62 | Barton | 18—30 |
| 3,110,061 | 11/63 | Hardy | 18—30 |

WILLIAM J. STEPHENSON, *Primary Examiner.*
MICHAEL V. BRINDISI, ROBERT F. WHITE,
*Examiners.*